(12) United States Patent
Huen et al.

(10) Patent No.: US 10,335,801 B2
(45) Date of Patent: Jul. 2, 2019

(54) LIGHT AND AIR FILTRATION UNIT WITH OZONE CATALYTIC OXIDATION

(71) Applicant: ASA Innovation & Technology Ltd., Hong Kong (HK)

(72) Inventors: Chun Kit Huen, Hong Kong (HK); Ngo Suet Mui, Hong Kong (HK)

(73) Assignee: ASA Innovation & Technology Ltd., Hong Kong (HK)

( * ) Notice: Subject to any disclaimer, the term of this patent is extended or adjusted under 35 U.S.C. 154(b) by 0 days.

(21) Appl. No.: 16/205,250

(22) Filed: Nov. 30, 2018

(65) Prior Publication Data

US 2019/0168160 A1 Jun. 6, 2019

Related U.S. Application Data

(60) Provisional application No. 62/594,011, filed on Dec. 3, 2017.

(51) Int. Cl.
   *B01D 53/02* (2006.01)
   *B03C 3/017* (2006.01)
   *F24F 3/16* (2006.01)

(52) U.S. Cl.
   CPC ............ *B03C 3/017* (2013.01); *F24F 3/1603* (2013.01); *F24F 2003/1635* (2013.01); *F24F 2003/1682* (2013.01); *F24F 2221/02* (2013.01); *Y02A 50/21* (2018.01); *Y10S 55/38* (2013.01)

(58) Field of Classification Search
   CPC .............. B03C 3/017; F24F 2003/1635; F24F 2003/1682; F24F 2221/02; F24F 3/1603; Y02A 50/21; Y10S 55/38
   See application file for complete search history.

(56) References Cited

U.S. PATENT DOCUMENTS

| | | | | |
|---|---|---|---|---|
| 5,779,769 A | * | 7/1998 | Jiang | B03C 3/017 96/55 |
| 7,338,181 B2 | * | 3/2008 | Yuen | A61L 9/20 362/253 |
| 2010/0260644 A1 | * | 10/2010 | Day | A61L 9/205 422/121 |

FOREIGN PATENT DOCUMENTS

| CN | 102679181 A | 9/2012 |
|---|---|---|
| CN | 204513655 U | 7/2015 |
| CN | 204555157 U | 8/2015 |
| CN | 205535409 U | 8/2016 |

OTHER PUBLICATIONS

International Search Report of PCT Patent Application No. PCT/CN2018/118371 issued on Feb. 18, 2019.

* cited by examiner

*Primary Examiner* — Christopher P Jones

(57) ABSTRACT

A light and air filtration unit with ozone catalytic oxidation includes a main housing and a filter housing detachably mounted to the main housing by a magnet. The filter housing carries a HEPA filter, a catalytic filter, ozone generators. An LED panel is mounted on a lower side of the filter housing. A fan and a main control unit are mounted within the main housing. An outer casing has a top wall disposed above the main housing and formed with air exhaust holes, a side wall surrounding and spaced apart from the filters and the LED panel, and a bottom opening. An annular air channel is formed between the side wall of the outer casing and the filters. The fan draws air into the unit through the bottom opening and out of the unit through the air exhaust holes.

20 Claims, 4 Drawing Sheets

LIGHT AND AIR FILTRATION UNIT WITH OZONE CATALYTIC OXIDATION

CROSS REFERENCE TO RELATED APPLICATIONS

The present application claims the benefit of U.S. Provisional Patent Application No. 62/594,011 filed on Dec. 3, 2017, the contents of which are incorporated herein by reference in its entirety.

TECHNICAL FIELD

The present disclosure relates generally to air purifiers. In particular, the present disclosure relates to a light and air filtration unit with ozone catalytic oxidation.

BACKGROUND TECHNOLOGY

A conventional air purifier includes a body which encloses a fan for drawing air into the purifier, a filter or multiple types/layers of filter for filtering the air, and a display which shows the operation status of the purifier. The disadvantages of a conventional air purifier are that (1) the design of the conventional air purifier does not match the interior design of a room, (2) the conventional air purifier is bulky and space consuming, and (3) the conventional air purifier serves only one purpose, i.e. it only filters air and does not have any other function.

For certain applications, a device that can serve multiple purposes is preferred. For instance, an air purifier that can also be used to provide illumination for a room may be preferred. By combining lighting and air filtration, a user can achieve high air quality standard, without sacrificing space and causing disruption of the interior design of a room.

SUMMARY

In view of the above disadvantages in the prior art, the object of the present application is to provide a multi-purpose device which illuminates, filters and disinfects the air in a particular space. In order to achieve the above object, a light and air filtration unit with ozone catalytic oxidation is provided, including:
  a main housing comprising an upper tubular portion and a lower tubular portion connected to a lower side of the upper tubular portion, the lower tubular portion being formed therearound with a plurality of main housing air vents;
  a hollow cylindrical catalytic filter disposed around the main housing air vents;
  a hollow cylindrical high efficiency particulate air (HEPA) filter disposed around the hollow cylindrical catalytic filter;
  at least one ozone generator disposed on an outer side of the HEPA filter;
  an electric fan mounted within the upper tubular portion;
  a light source provided on a lower side of the main housing;
  a main control unit mounted within the lower tubular portion, the main control unit being electrically connected to the at least one ozone generator, the fan and the light source;
  a lamp shade defining an outer casing, the outer casing comprising a top wall disposed above the upper tubular portion and formed with a plurality of air exhaust holes, a side wall surrounding and spaced apart from the HEPA filter and the light source, and a bottom opening; and
  an annular air channel formed between the side wall of the outer casing and the HEPA filter;
  wherein the fan draws air into the unit through the bottom opening and out of the unit through the air exhaust holes.

In an embodiment, the light and air filtration unit with ozone catalytic oxidation may further include a filter housing detachably mounted to the main housing, the filter housing having a hollow cylindrical body disposed around the lower tubular portion of the main housing, the hollow cylindrical body being formed therearound with a plurality of filter housing air vents, the hollow cylindrical catalytic filter being disposed around an inner surface of the hollow cylindrical body where the filter housing air vents are located, and the hollow cylindrical HEPA filter being disposed around an outer surface of the hollow cylindrical body where the filter housing air vents are located.

In an embodiment, the light source may be a light-emitting diodes (LED) panel provided thereon with a plurality of LEDs.

In an embodiment, the light and air filtration unit with ozone catalytic oxidation may further include a plurality of spring-loaded metal pins each extending from the main control unit to the LED panel, the main control unit being electrically connected to the LEDs provided on the LED panel through the spring-loaded metal pins.

In an embodiment, the main housing may further include an outwardly extending annular flange and an inwardly extending annular flange formed between the upper and lower tubular portions; and an outwardly extending bottom annular flange formed at a bottom end of the lower tubular portion.

In an embodiment, the filter housing may further include an inwardly extending top annular flange formed at a top end of the hollow cylindrical body; an inwardly extending bottom annular flange formed at a bottom end of the hollow cylindrical body; and an outwardly extending bottom annular flange formed at the bottom end of the hollow cylindrical body.

In an embodiment, the main housing and the filter housing may be made of metal, and the filter housing may be detachably mounted to the main housing by a magnet.

In an embodiment, the magnet may be a ring-shaped magnet partially embedded in a first annular groove formed on a lower surface of the outwardly extending annular flange of the main housing, and partially embedded in a second annular groove formed on an upper surface of the inwardly extending top annular flange of the filter housing.

In an embodiment, the hollow cylindrical HEPA filter may be held between the outwardly extending annular flange of the main housing and the outwardly extending bottom annular flange of the filter housing.

In an embodiment, the hollow cylindrical catalytic filter may be held between the inwardly extending top annular flange and the inwardly extending bottom annular flange of the filter housing.

In an embodiment, the fan may be mounted on top of the inwardly extending annular flange of the main housing.

In an embodiment, a light diffuser may be mounted at a lower side of the light source for diffusing light generated from the light source.

In an embodiment, the main control unit may be mounted on a top surface of a main control unit panel which is attached to a lower surface of the outwardly extending bottom annular flange of the main housing.

In an embodiment, each spring-loaded metal pins may extend from the main control unit to the LED panel through a pin opening formed on the main control unit panel.

In an embodiment, the top wall of the outer casing may be formed with a central opening, and the plurality of air exhaust holes is formed around the central opening.

In an embodiment, a tubular cable holder may be secured in the central opening of the outer casing and frictionally holding an electrical cable passing therethrough.

In an embodiment, the light and air filtration unit with ozone catalytic oxidation may further include an attaching member in the shape of a spoked wheel, the attaching member comprising a central hole through which the electrical cable passes, a plurality of airflow openings surrounding the central hole, and an outer skirt portion attached to an inner surface of the upper tubular portion of the main housing so that the main housing is attached to the electrical cable.

In an embodiment, the at least one ozone generator may be fixed on an outer edge of the outwardly extending annular flange of the main housing.

In an embodiment, four ozone generators may be fixed on and spaced equally apart along an outer edge of the outwardly extending annular flange of the main housing.

In an embodiment, a gap may be formed between the main control unit panel and the LED panel for dissipating heat generated by the LEDs of the LED panel.

DETAILED DESCRIPTION

Figure 1:
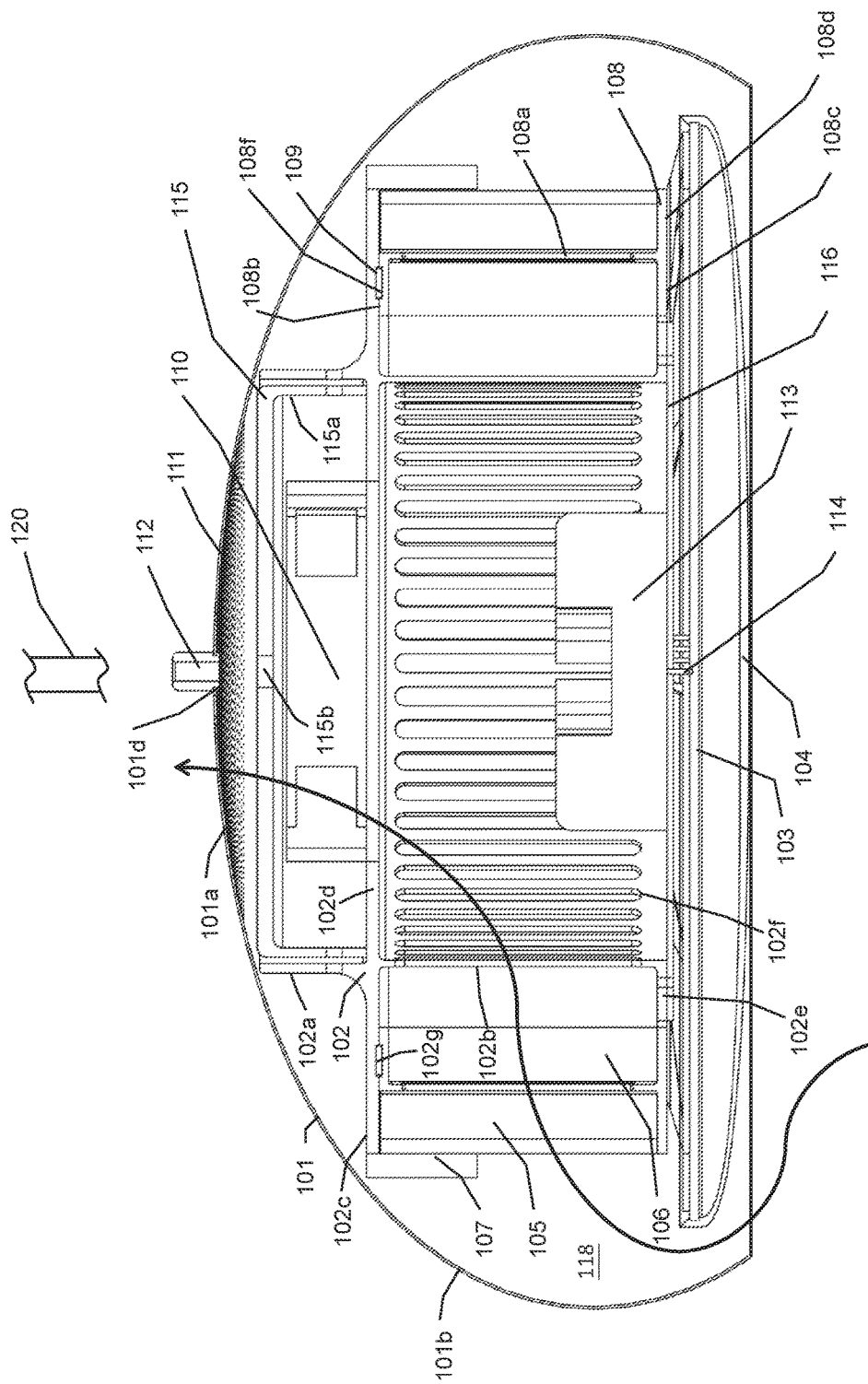
FIG. 1 is a sectional view of an embodiment of a light and air filtration unit with ozone catalytic oxidation in the form of a pendant lamp.

The embodiments of the present disclosure are described in detail below, and examples of the embodiments are illustrated in the drawings, wherein the same or similar reference numerals indicate the same or similar elements or elements having the same or similar functions. The following embodiments described with reference to the accompanying drawings are exemplary only for explaining the present disclosure and should not be construed as limiting the present disclosure.

In the description of the present disclosure, it is to be understood that the terms such as "upper", "lower", "front", "rear", "left", "right", "above", "below", "top", "bottom", "inner", "outer", "center", etc. are based on the orientation or positional relationship shown in the drawings, and are merely for the convenience of the description of the present disclosure and simplification of the description. It does not indicate or imply that the device or component referred to has a specific orientation, and is constructed and operated in a specific orientation. Therefore, it should not be construed as a limitation of the present disclosure.

As shown in FIGS. 1-4, the light and air filtration unit may include a lamp shade 101, a main housing 102, a light-emitting diodes (LED) panel 103, a light diffuser 104, a high efficiency particulate air (HEPA) filter 105, a catalytic filter 106, at least one ozone generator 107, a filter housing 108, a magnet 109, an electric fan 110, and a main control unit 113.

The main housing 102 may include an upper tubular portion 102a; a lower tubular portion 102b connected to a lower side of the upper tubular portion 102a; an outwardly extending annular flange 102c and an inwardly extending annular flange 102d formed between the upper and lower tubular portions 102a, 102b; and an outwardly extending bottom annular flange 102e formed at a bottom end of the lower tubular portion 102b. The lower tubular portion 102b may be formed therearound with a plurality of main housing air vents 102f. Using a pendant lamp as an example, as illustrated in FIG. 1, the main housing 102 is the main structure which supports the entire light and air filtration unit.

Figure 3:
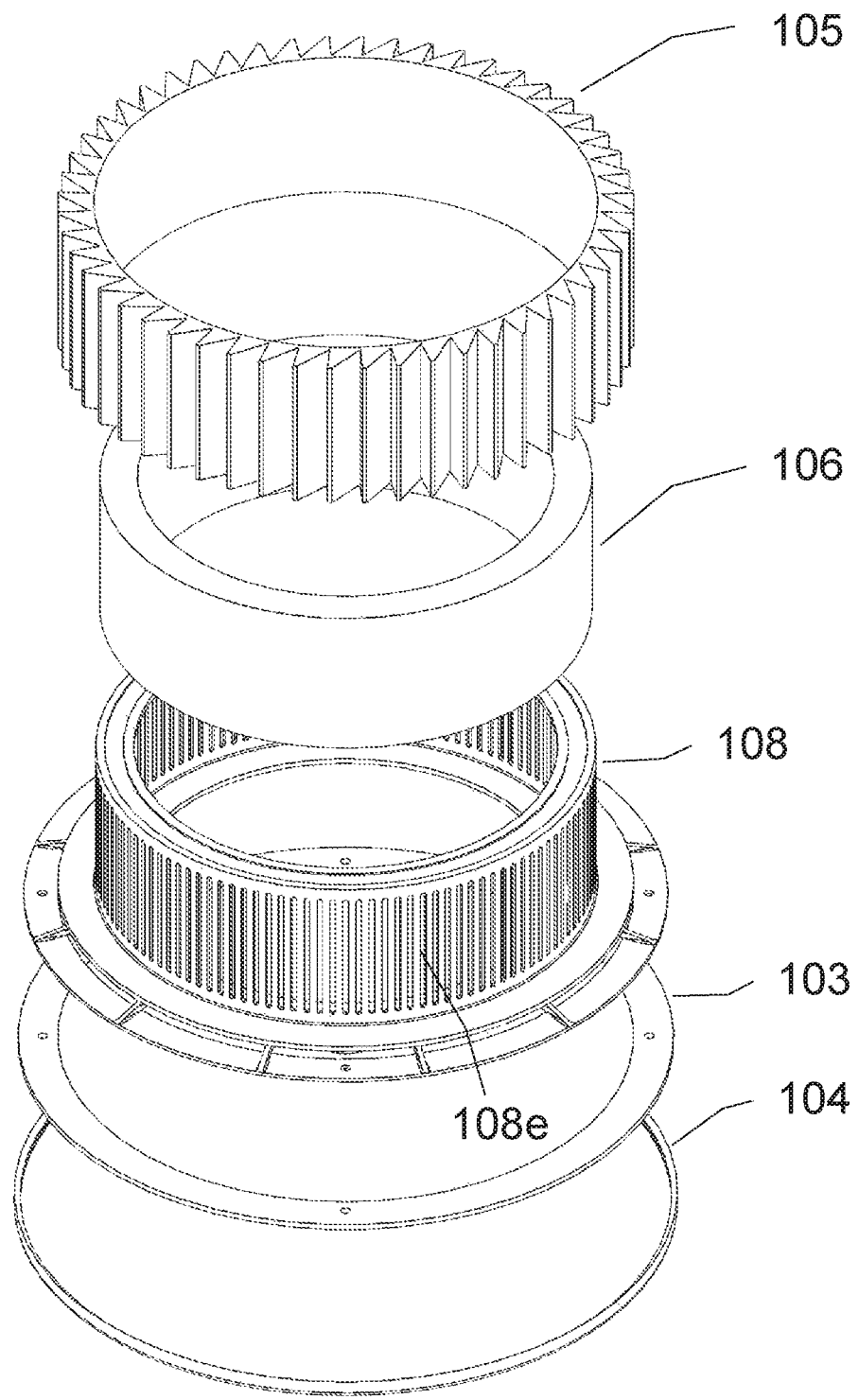
FIG. 3 is an exploded diagram of a detachable filter housing that holds the lighting and filter components.

The light and air filtration unit may include a filter housing 108. The filter housing 108 may be detachably mounted to the main housing 102. The filter housing 108 may include a hollow cylindrical body 108a disposed around the lower tubular portion 102b of the main housing 102; an inwardly extending top annular flange 108b formed at a top end of the hollow cylindrical body 108a; an inwardly extending bottom annular flange 108c formed at a bottom end of the hollow cylindrical body 108a; and an outwardly extending bottom annular flange 108d formed at the bottom end of the hollow cylindrical body 108a. The hollow cylindrical body 108a may be formed therearound with a plurality of filter housing air vents 108e, as illustrated in FIG. 3.

Figure 2:
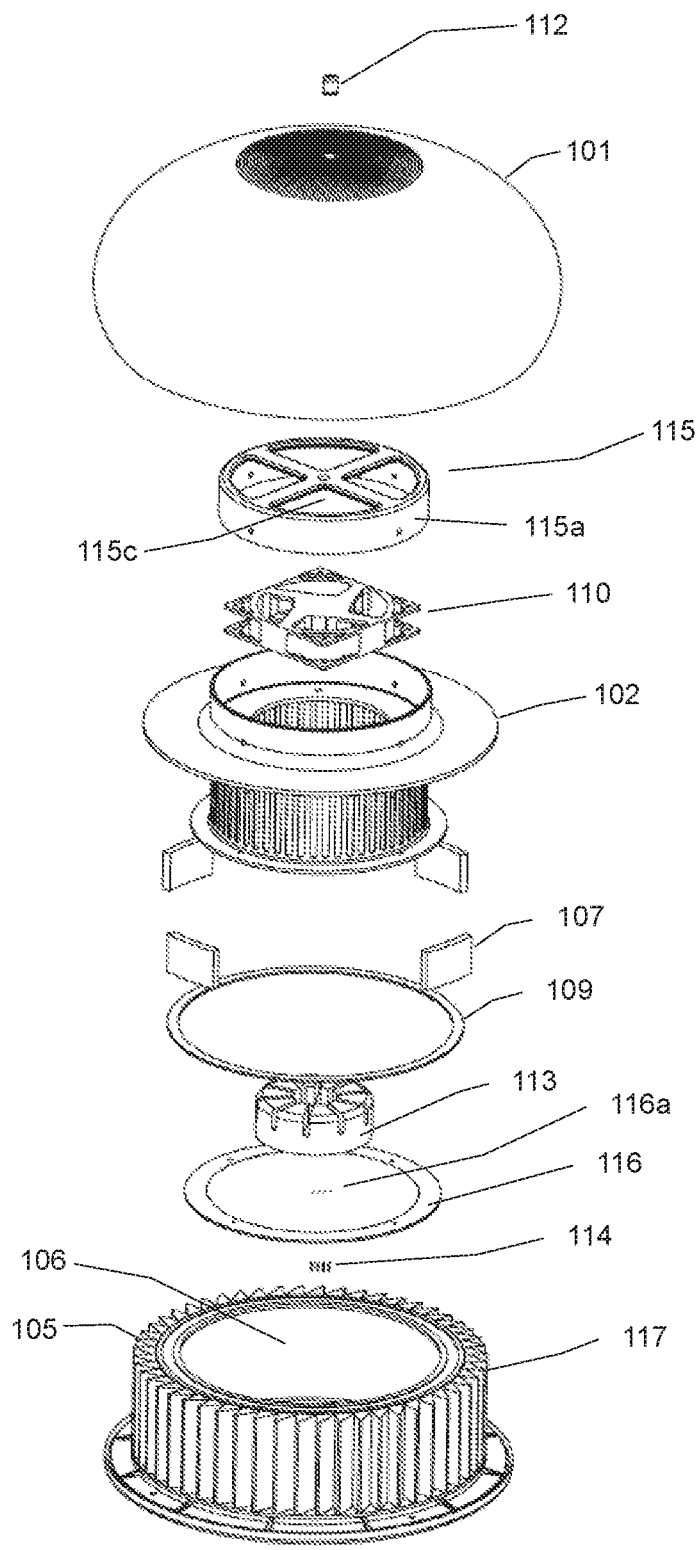
FIG. 2 is an exploded diagram of the light and air filtration unit with ozone catalytic oxidation in the form of a pendant lamp.

The filter housing 108 may be detachably attached to the main housing 102 by a magnet 109. As illustrated in FIG. 2, the magnet 109 may be in the shape of a ring. The ring-shaped magnetic 109 may be partially embedded in a first annular groove 102g formed on a lower surface of the outwardly extending annular flange 102c of the main housing 102, and partially embedded in a second annular groove 108f formed on an upper surface of the inwardly extending top annular flange 108b of the filter housing 108. The main housing 102 and the filter housing 108 may be made of metal. The filter housing 108 may be attachable to the main housing 102 by the ring-shaped magnetic 109.

The magnetic connection is adopted to ensure that a user is able to detach the filter housing 108 without the need of a tool. Once the filter housing 108 is detached from the main housing 102, a user can see that the HEPA filter 105 is placed on the outside of the filter housing 108. The HEPA filter 105 can be used to remove air borne particle matters, while the catalytic filter 106 is placed on the inside to process volatile organic compounds (VOCs). Both filters 105, 106 can be removed easily for replacement. The frequency for replacing the HEPA filter 105 mainly depends on the quality of the air.

Although it has been shown and described that the filter housing 108 can be detachably attached to the main housing 102 by an annular magnet 109, it is understood by a person skilled in the art that the filter housing 108 can be detachably attached to the main housing 102 by a magnet or a number of magnets in other possible form and shape. It is also possible that the filter housing 108 can be detachably attached to the main housing 102 by other connecting means, such as clips, hooks, etc.

The light and air filtration unit may include a HEPA filter 105. The HEPA filter 105 may be in the shape of a hollow cylinder. The HEPA filter 105 may be disposed around an outer surface of the hollow cylindrical body 108a where the filter housing air vents 108e are located. The HEPA filter 105 may be held between the outwardly extending annular flange 102c of the main housing 102 and the outwardly extending bottom annular flange 108d of the filter housing 108. The HEPA filter 105 can physically filter particles in the air.

The light and air filtration unit may further include a catalytic filter 106. The catalytic filter 106 may also be in the shape of a hollow cylinder. The catalytic filter 106 may be disposed around an inner surface of the hollow cylindrical body 108a where the filter housing air vents 108e are located. The catalytic filter 106 may be held between the inwardly extending top annular flange 108b and the inwardly extending bottom annular flange 108c of the filter housing 108. The catalytic filter 106 can enhance chemical reaction for the ozone and organic chemical pollutants in the air.

The light and air filtration unit may include at least one ozone generator 107 for the generation of ozone. The at least one ozone generator 107 may be fixed at an outer edge of the outwardly extending annular flange 102c of the main housing 102. The ozone generator 107 may be disposed on an outer side of the HEPA filter 105. In the embodiment shown in FIG. 2, there are four ozone generators 107 spaced equally apart along the outer edge of the outwardly extending annular flange 102c.

The light and air filtration unit may include a fan 110. The fan 110 may be mounted on top of the inwardly extending annular flange 102d of the main housing 102 within the upper tubular portion 102a of the main housing 102, as best illustrated in FIG. 2. The fan 110 can be any conventional fan that can draw air from one side of the fan to an opposite side of the fan. For simplicity, this conventional fan 110 is represented by a rectangular box in the drawings.

To generate light for illumination, the light and air filtration unit may include a light source. In an embodiment, the light source can be in the form of an energy efficient LED panel 103. The LED panel 103 may be disposed on a lower side of the main and filter housings 102, 108. The LED panel 103 may be provided with a plurality of LEDs (not shown) in a manner known in the art.

Figure 4:
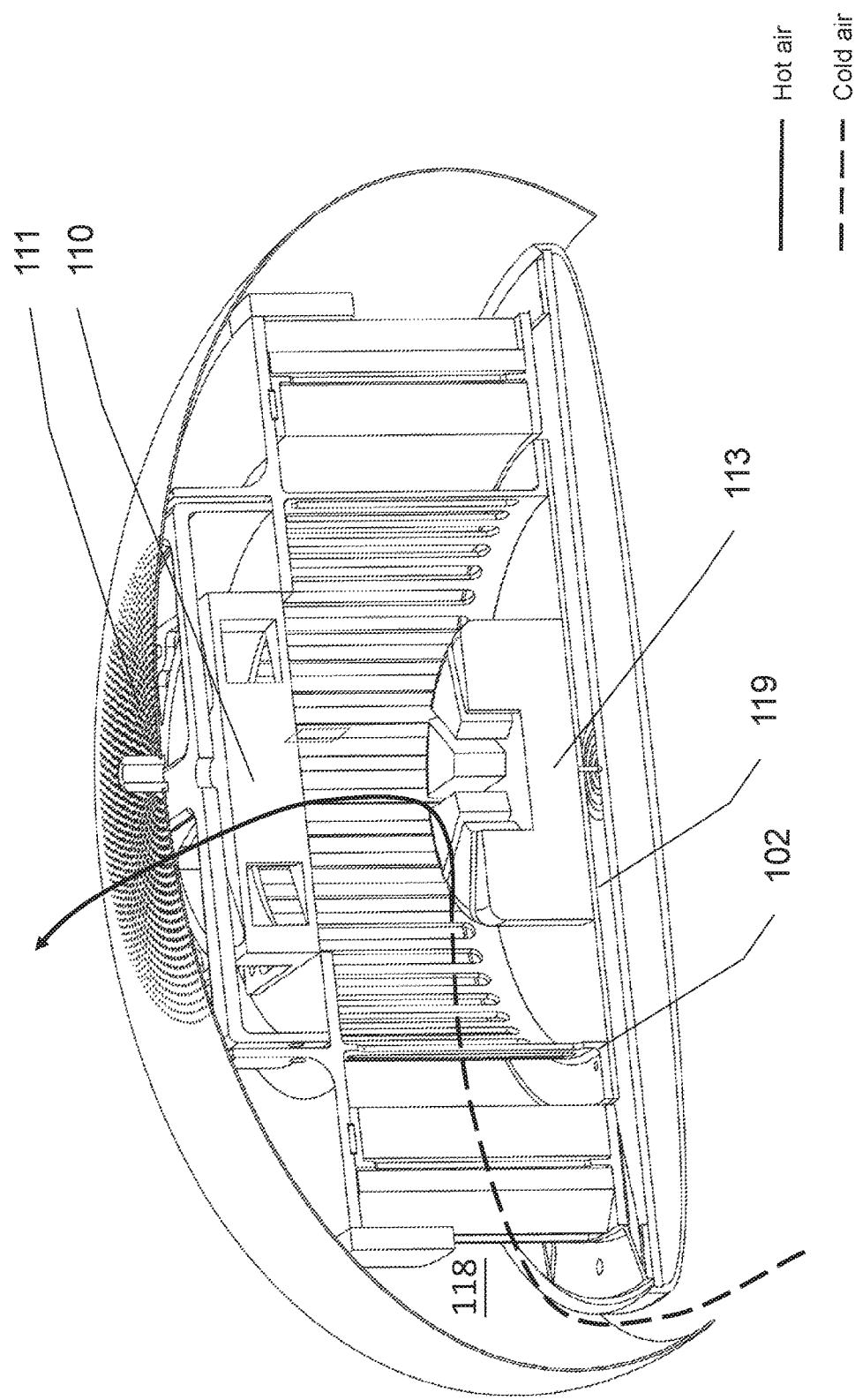
FIG. 4 is a cutaway view of the light and air filtration unit with ozone catalytic oxidation showing heat dissipation mechanism of the unit.

As shown in FIG. 4, a gap 119 may be formed between the main control unit panel 116 and the LED panel 103. The gap 119 can serve to dissipate heat generated by the LEDs of the LED panel 103.

A light diffuser 104 may be mounted at a lower side of the LED panel 103 for diffusing light emitted from the plurality of LEDs. The light diffuser 104 may be in the form of a curved light diffuser, as shown in FIG. 1.

A main control unit 113 may be provided to control the electronic components in the light and air filtration unit. The main control unit 113 may be accommodated within the lower tubular portion 102b of the main housing 102 and may be mounted on top of a main control unit panel 116 attached to a lower surface of the outwardly extending bottom annular flange 102e of the main housing 102. The main control unit 113 may be electrically connected to the ozone generators 107, the fan 110 and the LEDs on the LED panel 103. The main control unit 113 may include of all necessary electronics and circuits to control and coordinate the light and air filtration unit.

A plurality of spring-loaded metal pins 114 each extending from the main control unit 113 to the LED panel 103 through a pin opening 116a formed on the main control unit panel 106. The main control unit 113 can be electrically connected to the LEDs on the LED panel 103 through the metal pins 114.

The light and air filtration unit may include a lamp shade 101 defining an outer casing. The outer casing may include a top wall 101a disposed above the upper tubular portion 102a of the main housing 102, a side wall 101b surrounding and spaced apart from the HEPA filter 105 and the LED panel 103, and a bottom opening 101c. The top wall 101a may be formed with a central opening 101d and a plurality of air exhaust holes 111 surrounding the central opening 101d. A tubular cable holder 112 may be secured in the central opening 101d and frictionally holding an electrical cable 120 passing therethrough. An annular air channel 118 may be formed between the side wall 101b of the outer casing and the HEPA filter 105.

An attaching member 115 may be provided to serve as an attachment between the electrical cable 120 and the main housing 102. The attaching member 115 may be in the shape of a spoked wheel having a skirt portion 115a, a central hole 115b, and a plurality of airflow openings 115c. The plurality of airflow openings 115c can allow air to flow therethrough. The skirt portion 115a may be attached to an inner surface of the upper tubular portion 102a of the main housing 102. The central hole 115b can allow the electrical cable 120 to pass through. The attaching member 115 can attach and hold the main housing 102 to the electrical cable 120 so that the entire light and air filtration unit can be hanged from a ceiling by the electrical cable 120.

The fan 110 can draw air through an airflow path in the unit defined by air flowing through the bottom opening 101c, the annular air channel 118 filled with ozone emitted from the ozone generator 107, the HEPA filter 105, the filter housing air vents 108e, the catalytic filter 106, the main housing air vents 102f, the lower tubular portion 102b filled with heat dissipated from the main control unit 113, the upper tubular portion 102a, and the air exhaust holes 111. The airflow path and direction are shown by the arrow in FIG. 1.

It is understood that the lamp shade 101 can come in different forms and shapes. The diagrams attached are for illustration purposes only and should not limit the form and shape of the lamp shade. For example, the light and air filtration unit can be designed as a pendant lamp, a ceiling lamp, a floor lamp etc. The light and air filtration unit has two main functions, namely lighting and air treatment. These two functions can be activated independently. For instance, if a user finds that the air quality of a room is acceptable, he or she can choose to activate the light unit without operating the air treatment unit.

When the user switches on the air filtration unit with ozone catalytic oxidation, the main control unit 113 switches on the fan 110 and the ozone generator 107. Dirty air can be drawn into the lamp shade 101 from the bottom opening 101c and mixed with ozone before passing through the HEPA filter 105. When the air-ozone mixture passes through the HEPA filter 105, air borne particles can be filtered out while ozone can kill the air borne bacteria and virus, and disinfect the filter surface which may be formed with mildew. The air-ozone mixture then passes through the catalytic filter 106 where the reaction between ozone and volatile organic compounds (VOCs) can be speeded up. VOCs can be oxidized with ozone and turned into water, carbon-dioxide, and other harmless substances. The fully treated air, i.e. clean air, then flows out of the lamp shade 101 and back into the room.

FIG. 4 shows the heat dissipation mechanism of the light and air filtration unit of the present disclosure. The light and air filtration unit can employ one fan for drawing air through the unit for purification, and making use of the air stream to cool the electronic components. Maintaining a low working temperature is critical for prolonging the life span of electronic components and particularly the LED components. Most of the heat generating components are allocated in the core area of the air filtration unit. After air passes through the HEPA filter 105 and then the catalytic filter 106, the air at room temperature then enters the core area where the hot electronic components are located. The air stream passes through the electronic components that can be arranged in such a way that promotes heat exchange between the electronic components and the air stream. The orientation and arrangement of the electronic components should also minimize air drag and pressure drop along the flow path. The air then carries the heat away on its way exiting the unit. The active cooling methodology is much more effective compared with natural convection from the electronic components, and much more energy effective if an additional fan is needed. This flow path is specially designed so the fan can function as a cooling component for prolonging the device's life span.

Active carbon is still one of the most popular materials being used in the gas and liquid filtration industry. The charring process (the making of charcoal) is known as pyrolysis, which is the chemical decomposition of raw materials, such as coconut shell, wood, etc. by heating in the absence of oxygen. During the charring process, green gases are produced and released into the atmosphere. The annual production rate of active carbon is expected to be 1.77 million ton (MT) in 2017. On average, 1 MT of coconut shells releases about 12 to 15 Kg of methane into the atmosphere. In other words, creating replacement filters contribute a large amount of greenhouse gases each year. By employing ozone with catalytic filter, which last much longer and do not release as much greenhouse gases during the preparation process, environment impact is significantly improved.

In summary, the present disclosure relates to a combination of a light unit and an air filtration unit. The present disclosure provides illumination, air filtration, and air disinfection in a particular space. A light unit may include an illumination element and a housing which encloses the illumination element and the air treatment unit. A fan can draw air into the unit from one side of the unit, through an airflow path where air is filtered and treated by high efficiency particulate air (HEPA) filter, catalytic filter, and ozone, and then out of the unit on the opposite side.

The above disclosed is only the preferred embodiments of the present disclosure. Of course, it cannot be used to limit the scope of protection of the present disclosure. Therefore, any equivalent modifications made according to the scope of the appending claims are still within the scope covered by the present disclosure.

What is claimed is:

1. A light and air filtration unit with ozone catalytic oxidation, the unit comprising:
   a main housing comprising an upper tubular portion and a lower tubular portion connected to a lower side of the upper tubular portion, the lower tubular portion being formed therearound with a plurality of main housing air vents;
   a hollow cylindrical catalytic filter disposed around the main housing air vents;
   a hollow cylindrical high efficiency particulate air (HEPA) filter disposed around the hollow cylindrical catalytic filter;
   at least one ozone generator disposed on an outer side of the HEPA filter;
   an electric fan mounted within the upper tubular portion;
   a light source provided on a lower side of the main housing;
   a main control unit mounted within the lower tubular portion, the main control unit being electrically connected to the at least one ozone generator, the fan and the light source;
   a lamp shade defining an outer casing, the outer casing comprising a top wall disposed above the upper tubular portion and formed with a plurality of air exhaust holes, a side wall surrounding and spaced apart from the HEPA filter and the light source, and a bottom opening; and
   an annular air channel formed between the side wall of the outer casing and the HEPA filter;
   wherein the fan draws air into the unit through the bottom opening and out of the unit through the air exhaust holes.

2. The light and air filtration unit with ozone catalytic oxidation according to claim 1, further comprising a filter housing detachably mounted to the main housing, the filter housing having a hollow cylindrical body disposed around the lower tubular portion of the main housing, the hollow cylindrical body being formed therearound with a plurality of filter housing air vents, the hollow cylindrical catalytic filter being disposed around an inner surface of the hollow cylindrical body where the filter housing air vents are located, and the hollow cylindrical HEPA filter being disposed around an outer surface of the hollow cylindrical body where the filter housing air vents are located.

3. The light and air filtration unit with ozone catalytic oxidation according to claim 1, wherein the light source is a light-emitting diodes (LED) panel provided thereon with a plurality of LEDs.

4. The light and air filtration unit with ozone catalytic oxidation according to claim 3, further comprising a plurality of spring-loaded metal pins each extending from the main control unit to the LED panel, the main control unit being electrically connected to the LEDs provided on the LED panel through the spring-loaded metal pins.

5. The light and air filtration unit with ozone catalytic oxidation according to claim 4, wherein the main housing further comprises:
   an outwardly extending annular flange and an inwardly extending annular flange formed between the upper and lower tubular portions; and
   an outwardly extending bottom annular flange formed at a bottom end of the lower tubular portion.

6. The light and air filtration unit with ozone catalytic oxidation according to claim 5, wherein the filter housing further comprises:
   an inwardly extending top annular flange formed at a top end of the hollow cylindrical body;
   an inwardly extending bottom annular flange formed at a bottom end of the hollow cylindrical body; and
   an outwardly extending bottom annular flange formed at the bottom end of the hollow cylindrical body.

7. The light and air filtration unit with ozone catalytic oxidation according to claim 6, wherein the main housing and the filter housing are made of metal, and the filter housing is detachably mounted to the main housing by a magnet.

8. The light and air filtration unit with ozone catalytic oxidation according to claim 5, wherein the magnet is a ring-shaped magnet partially embedded in a first annular groove formed on a lower surface of the outwardly extending annular flange of the main housing, and partially embedded in a second annular groove formed on an upper surface of the inwardly extending top annular flange of the filter housing.

9. The light and air filtration unit with ozone catalytic oxidation according to claim 6, wherein the hollow cylindrical HEPA filter is held between the outwardly extending annular flange of the main housing and the outwardly extending bottom annular flange of the filter housing.

10. The light and air filtration unit with ozone catalytic oxidation according to claim 9, wherein the hollow cylindrical catalytic filter is held between the inwardly extending top annular flange and the inwardly extending bottom annular flange of the filter housing.

11. The light and air filtration unit with ozone catalytic oxidation according to claim 6, wherein the fan is mounted on top of the inwardly extending annular flange of the main housing.

12. The light and air filtration unit with ozone catalytic oxidation according to claim 1, wherein a light diffuser is mounted at a lower side of the light source for diffusing light generated from the light source.

13. The light and air filtration unit with ozone catalytic oxidation according to claim 7, wherein the main control unit is mounted on a top surface of a main control unit panel which is attached to a lower surface of the outwardly extending bottom annular flange of the main housing.

14. The light and air filtration unit with ozone catalytic oxidation according to claim 13, wherein each spring-loaded metal pin extends from the main control unit to the LED panel through a pin opening formed on the main control unit panel.

15. The light and air filtration unit with ozone catalytic oxidation according to claim 1, wherein the top wall of the outer casing is formed with a central opening, and the plurality of air exhaust holes is formed around the central opening.

16. The light and air filtration unit with ozone catalytic oxidation according to claim 15, wherein a tubular cable holder is secured in the central opening of the outer casing and frictionally holding an electrical cable passing therethrough.

17. The light and air filtration unit with ozone catalytic oxidation according to claim 16, further comprising an attaching member in the shape of a spoked wheel, the attaching member comprising a central hole through which the electrical cable passes, a plurality of airflow openings surrounding the central hole, and an outer skirt portion attached to an inner surface of the upper tubular portion of the main housing so that the main housing is attached to the electrical cable.

18. The light and air filtration unit with ozone catalytic oxidation according to claim 6, wherein the at least one ozone generator is fixed on an outer edge of the outwardly extending annular flange of the main housing.

19. The light and air filtration unit with ozone catalytic oxidation according to claim 6, wherein four ozone generators are fixed on and spaced equally apart along an outer edge of the outwardly extending annular flange of the main housing.

20. The light and air filtration unit with ozone catalytic oxidation according to claim 13, wherein a gap is formed between the main control unit panel and the LED panel for dissipating heat generated by the LEDs of the LED panel.

\* \* \* \* \*